United States Patent Office.

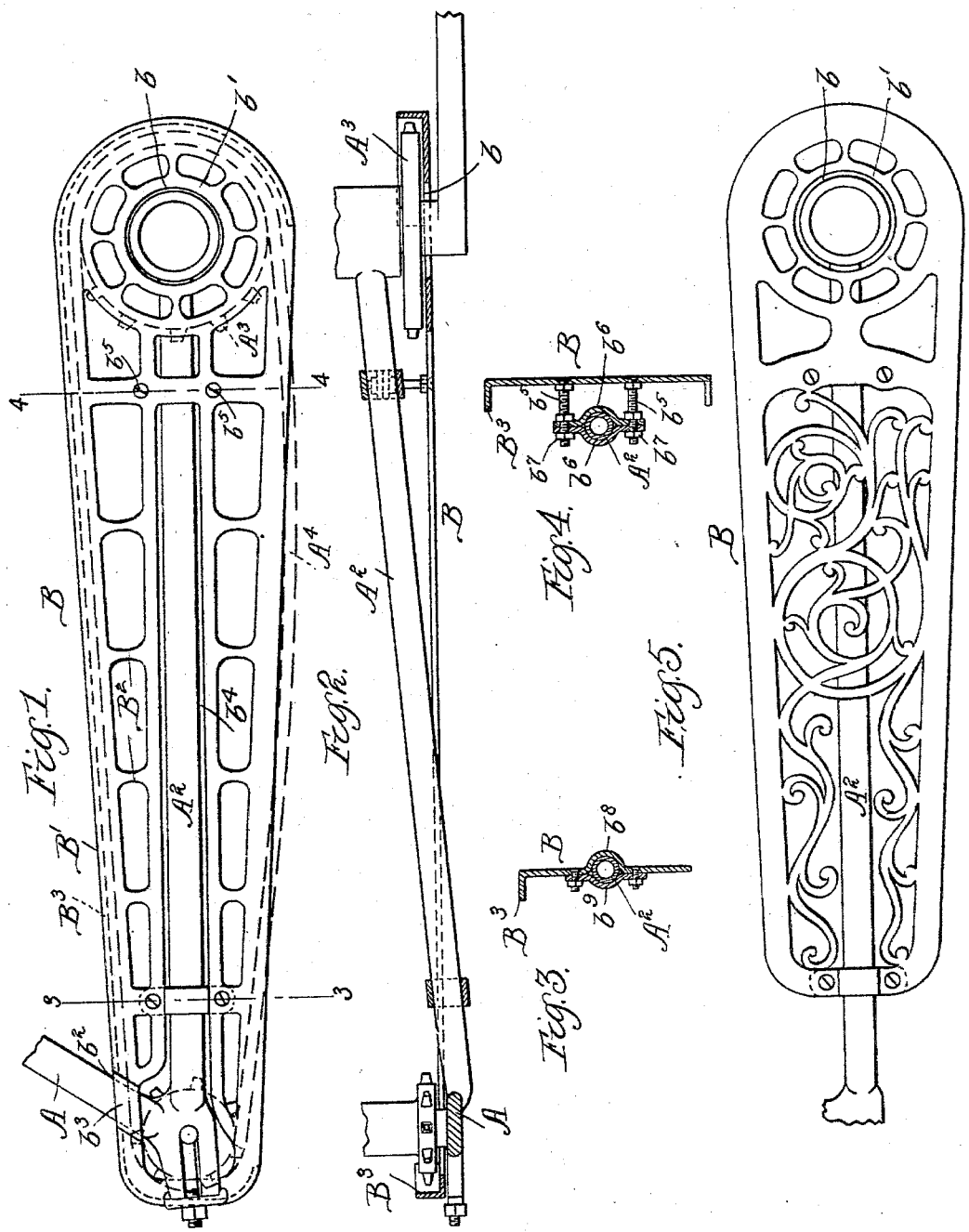

WILLIAM S. NOYES, OF CHICAGO, ILLINOIS.

CHAIN-GUARD FOR BICYCLES.

SPECIFICATION forming part of Letters Patent No. 598,056, dated January 25, 1898.

Application filed August 25, 1896. Serial No. 603,841. (No model.)

*To all whom it may concern:*

Be it known that I, WILLIAM S. NOYES, a citizen of the United States, and a resident of Chicago, in the county of Cook and State of Illinois, have invented a new and useful Sprocket-Wheel and Chain Guard for Bicycles, of which the following is a specification.

This invention relates to that class or type of sprocket-wheel and chain guards or shields for bicycles designed to prevent the skirts of women riders from coming into contact with said sprocket-wheels and driving-chain, thus effectually preventing the skirts of such women riders from becoming caught and entangled therein or being soiled thereby. Heretofore chain guards or shields for this purpose have consisted of a rim or frame of wood or metal, comprising a middle curved portion adapted to extend around and cover the front sprocket-wheel and straight rearward extensions which are substantially parallel with the upper and lower laps or sections of the driving-chain, a laced front or the like preventing access of large objects to the portion of sprocket-wheels and driving-chain covered by said guards. Guards or shields of this construction are objectionable for the following reasons: Wood rims are very liable to warp and get out of adjustment. Guards of this kind are unsightly and detract materially from the appearance of wheels equipped therewith. The cord lacing is very liable to be broken and torn, in which condition it frequently causes serious accidents and renders the guard more unsightly and ugly in appearance than it is normally, and the slack lower lap of the driving-chain frequently strikes the lower section of said guard, making a disagreeable rattle and noise. I am aware, also, that in order to protect the sprocket-wheels and driving-chain of a bicycle from mud, dust, moisture, and dirt generally they have been inclosed within suitable tight casing, commonly known as a "gear-case." Incidentally, also, such gear-cases effectually prevent the garments of a rider from coming into contact with the sprocket-wheels and driving-chain. Such gear-cases are objectionable on account of their weight, cost, and general unsightliness, and in the climate of this country are unnecessary and are practically unused.

The object of my invention is to provide a chain guard or shield for bicycles which shall be free from all of the foregoing objectionable features, which shall be efficient, durable, and neat and ornamental in appearance.

To these ends a guard or shield embodying my invention comprises a metal marginal rim or frame, a flange which projects laterally from said rim or frame and is adapted to cover the upper lap of the driving-chain, the front face or edge of the forward sprocket-wheel, and which preferably extends around the rear face or edge of the rear sprocket-wheel, said flange being discontinuous beneath the lower lap of the driving-chain, metal open-work which occupies the space within said marginal rim or frame, which connects the opposite sides thereof, reinforcing and strengthening the rim and giving the whole structure a highly ornamental and graceful appearance, and suitable openings or apertures in said metal open-work to receive and accommodate the crank-shaft and frame members of the bicycle to enable said guard or shield to be applied to a bicycle. Preferably, also, a guard or shield embodying my invention consists of an integral piece of metal cast or stamped into the form above described.

The invention also consists of the various other features and combinations of features hereinafter described and claimed.

In the accompanying drawings a guard or shield embodying my invention is fully illustrated.

Figure 1 is a side view of a shield or guard embodying my invention, showing the same in position upon a bicycle. Fig. 2 is a longitudinal sectional view thereof on the line 2 2 of Fig. 1, the parts of the bicycle being shown in plan view. Figs. 3 and 4 are transverse sectional views of said guard or shield on the lines 3 3 and 4 4, respectively, of Fig. 1; and Fig. 5 is a side view of a modified form of my improved guard or shield.

Referring now to the drawings, A designates the rear frame member of a bicycle; A', the lower frame member thereof; $A^2$, the rear sprocket-wheel; $A^3$, the front sprocket-wheel; $A^4$, the driving-chain, while B designates as a whole a chain guard or shield embodying my invention.

The guard or shield B comprises a marginal frame or rim B', which in the preferable form shown is solid and the edges thereof continuous. The upper portion of the rim or frame B' is provided with a flange B², which projects laterally therefrom and is adapted to cover the upper lap of the driving-chain and which is preferably prolonged around the sprocket-wheels, all as clearly shown in the drawings. The lower portion of the rim B is without a flange, the flange B' being discontinuous beneath the lower lap of the driving-chain, as clearly indicated in Fig. 1 by the absence of the dotted line, which defines said flange, the discontinuance of said flange being primarily for the purpose of preventing the driving-chain from striking the same. Incidentally, also, this construction makes a lighter guard and one more easily and cheaply manufactured.

The space within the frame or rim B' is occupied by a web or front of light open-work B³, formed integral with said marginal frame. This open-work may form different designs. In the drawings two designs are shown, and any other designs—as, for instance, a monogram or a name—may be substituted therefor without departing from my invention, the essential feature being that the top and bottom of the rim or frame B' shall be connected across the open space by bars or branches of metal formed integral therewith, which will reinforce and strengthen the long and slender top and bottom portions of said rim or marginal frame to prevent them from being accidentally bent or broken when in use and of such design as to be agreeable to the eye without adding materially to the weight of the guard or shield and which will prevent the rider's dress from coming into contact with the sprocket-wheels or driving-chain.

At the forward end of the guard or shield a hole or opening $b$ is formed in the open-work or web B³ to receive the crank-shaft of the bicycle. This hole or opening is defined by a continuous border of metal, which preferably forms a ring $b'$, and is made integral with and is supported by the open-work B³, the position of said ring being such that when the guard B is secured upon a bicycle the ring will be substantially concentric with the crank-shaft. To enable the guard to be adjusted in position upon a bicycle, an opening $b^2$, which, as shown, is bridged by a bow or yoke $b^3$, and an opening $b^4$ are formed in the open-work or web B³. In the preferable construction shown in Fig. 1 of the drawings the opening $b^4$ is defined by straight and substantially parallel bars of metal formed integral with said open-work front or web B³.

In Fig. 5 of the drawings I have shown a modified form of my improved guard or shield, which may appropriately be termed a "universal" guard—that is, it is available for use on bicycles of different makes in which the sizes of and the distances between the sprocket-wheels vary. Said modification consists in making said guard of such length that when adjusted upon a bicycle the rear end thereof will be in front of the bearing of the rear wheel of the bicycle.

My improved guard may be secured to the frame of the bicycle in any desired or approved manner and will preferably be so supported as to be laterally adjustable.

As shown in the drawings, said guard or shield B is supported upon the lower frame member A' in the following manner: Rigidly secured in said guard, adjacent to its forward end, are bolts or studs $b^5$, which pass through holes in the ends of yokes or clips $b^6$, which embrace said frame member A', and are secured thereto by nuts $b^7$, threaded to said studs or bolts $b^5$ on both sides of said yokes or clips $b^6$. Said nuts operate to clamp said yokes or clips $b^6$ upon said frame member A', and also afford convenient means to adjust the guard or shield laterally relatively to the forward sprocket-wheel. As shown, the rear end of said guard or shield is secured in permanent adjustment to the lower frame member between a yoke $b^8$, formed integral with said guard, and a yoke or clip $b^9$, bolted thereto. If desired, however, the rear end of said guard or shield may be supported in the same manner as the forward end, so as to be laterally adjustable.

I claim—

1. A guard for the sprocket-wheel and driving-chain of safety-bicycles, comprising a marginal frame, a flange extending laterally therefrom to cover the upper lap of a driving-chain and the upper exposed segment of a sprocket, and a web connecting the longitudinal parts of the marginal frame, substantially as described.

2. A guard or shield for chain-driving safety-bicycles comprising a marginal frame shaped coincident with the laps of a driving-chain, and its sprockets, a flange extending laterally from said frame to overhang the upper lap of such chain and the front and rear exposed parts or segments, respectively, of the sprockets, and a skeleton web connecting the legs of the marginal frame, substantially as described.

In testimony that I claim the foregoing as my invention I hereunto set my hand this 12th day of August, 1896.

WILLIAM S. NOYES.

Witnesses:
J. B. PECK,
W. S. PECK.